United States Patent [19]

Oi et al.

[11] 4,354,919

[45] Oct. 19, 1982

[54] PROCESS FOR THE LIQUEFACTION OF COAL

[75] Inventors: Shoichi Oi; Noriaki Ohnishi, both of Ogawamachi; Shinya Mori, Tsubukuhonmachi; Tadanobu Takata, Kumamoto; Keiichiro Koba, Ohtanimachi, all of Japan

[73] Assignees: Mitsui Coke Co., Ltd.; Mitsui-Kozan Coking Industry Co., Ltd., both of Japan

[21] Appl. No.: 231,273

[22] Filed: Feb. 4, 1981

[30] Foreign Application Priority Data

Feb. 19, 1980 [JP] Japan .................................. 55-18591

[51] Int. Cl.$^3$ ............................................... C10G 1/06
[52] U.S. Cl. ....................................................... 208/10
[58] Field of Search ............................................ 208/10

[56] References Cited

U.S. PATENT DOCUMENTS

| | | | |
|---|---|---|---|
| 3,775,286 | 11/1973 | Mukheyer et al. | 208/10 |
| 4,148,709 | 4/1979 | Sze | 208/10 |
| 4,176,041 | 11/1979 | Mori et al. | 208/10 |
| 4,214,977 | 7/1980 | Ranganathan et al. | 208/10 X |

FOREIGN PATENT DOCUMENTS

| | | | |
|---|---|---|---|
| 24642 | 9/1935 | Australia | 208/10 |
| 55-116793 | 9/1980 | Japan | 208/10 |
| 55-116794 | 9/1980 | Japan | 208/10 |

*Primary Examiner*—Delbert E. Gantz
*Assistant Examiner*—William G. Wright
*Attorney, Agent, or Firm*—McGlew and Tuttle

[57] ABSTRACT

Disclosed is a process for the liquefaction of coal in which a slurry composed of the coal, a solvent, and an iron ore consisting mainly of a hydrate of iron oxide is heated under an elevated pressure of hydrogen.

7 Claims, No Drawings

PROCESS FOR THE LIQUEFACTION OF COAL

BACKGROUND OF THE INVENTION

1. Field of the Invention

This invention relates to improvements in a process for the liquefaction of coal and, more particularly, to a process for the liquefaction of coal by hydrogenating the coal in the presence of a solvent in which an iron ore consisting mainly of a hydrate of iron oxide is used as the catalyst.

2. Description of the Prior Art

It is well known that coal can be liquefied by heating a slurry composed of the coal, a solvent and a catalyst under an elevated pressure of hydrogen. The catalysts which are known to be useful for this purpose include cobalt-molybdenum catalysts, nickel-molybdenum catalysts, and halide catalysts such as zinc chloride, tin chloride, etc. However, these catalysts are disadvantageous in that their catalytic activity is greatly reduced in a short period of time and their recovery from the coal liquefaction product is very difficult. Accordingly, it is desirable to use an inexpensive and disposable catalyst in the liquefaction of coal.

Typical examples of such a disposable catalyst are iron catalysts such as iron sulfide, iron sulfate, hematite, red mud, etc. Among others, iron sulfide of the formula $FeS_x$ is known to be highly effective in enhancing the yield of liquefied coal.

In some conventional processes using iron sulfide as the catalyst, this is accomplished by utilizing the iron sulfide present in the ash of coal or by feeding iron or a compound thereof and sulfur, together with a slurry composed of coal and a solvent, to the coal liquefaction step so that iron sulfide may be formed in situ. In addition, there have been proposed a process in which ferrous waste produced abundantly from ironworks or the like is used in place of the aforesaid iron or compound thereof (Japanese Patent Laid-Open No. 105504/1978) and a process in which the sulfur fed to the coal liquefaction step is replaced by a mixture of hydrogen sulfide gas and hydrogen gas (Japanese Patent Laid-Open No. 124006/1979).

However, all of these processes have the disadvantage of using sulfur or sulfur-containing substances. More specifically, one advantage of the liquefaction of coal by hydrogenation is the so-called desulfurizing effect, that is, a reduction in the sulfur content of the coal liquefaction product. However, if sulfur or hydrogen sulfide gas is used as the catalyst, it combines with the coal liquefaction product to elevate the sulfur content of the coal liquefaction product, especially of its high-boiling fractions having a boiling point of 300° C. or above. Accordingly, this coal liquefaction product can hardly be used as a clean energy source, coke, or high-quality carbon materials including a binder for electrodes, carbon fiber and the like, and graphite materials. Moreover, the increased evolution of hydrogen sulfide gas inevitably requires an enlargement of the desulfurizing equipment, thus making the coal liquefaction process expensive.

On the other hand, iron catalysts containing little or no sulfur (for example, hematite consisting mainly of anhydrous iron oxide) have the disadvantage that their catalytic activity is too low for the liquefaction of coal.

SUMMARY OF THE INVENTION

It is an object of the present invention to provide an improved process for the liquefaction of coal which uses an inexpensive catalyst containing practically no sulfur.

It is another object of the present invention to provide an improved process for the liquefaction of coal in which the coal can be liquefied efficiently by using a highly active catalyst.

It is still another object of the present invention to provide an improved process for the liquefaction of coal which can yield a coal liquefaction product having a low sulfur content.

These objects of the present invention are accomplished by providing, in a process for the liquefaction of coal by heating a slurry composed of the coal, a solvent and a catalyst under an elevated pressure of hydrogen, the improvement in which the catalyst is an iron ore consisting mainly of a hydrate of iron oxide.

DETAILED DESCRIPTION OF THE INVENTION

The catalyst used in the present invention is an iron ore which occurs in nature and consists mainly of a hydrate of limonite, lepidocrocite, goethite, bog iron ore, ochre, and iron oxide obtained by introducing mine waste water into a settling pond to precipitate and hydrate the iron oxide contained therein. The iron ore preferably has an iron content of from 20 to 70% by weight, more preferably from 30 to 65% by weight, based on the weight of the iron ore freed of adhesive moisture (or hygroscopic moisture). Although no particular limitation is placed on the sulfur content, the iron ore preferably has a sulfur content of not more than 3% by weight based on the weight of the iron ore freed of adhesive moisture (or hygroscopic moisture). Moreover, the content of water bound to the iron oxide is preferably from 5 to 20% by weight, more preferably from 6 to 18% by weight, based on the weight of the iron ore freed of adhesive moisture (or hygroscopic moisture).

On the assumption that the catalyst comprises an iron ore freed of adhesive moisture, the catalyst is used in an amount of from 0.3 to 10% by weight based on the weight of the coal as expressed on a water-free and ash-free basis. If the amount of catalyst used is less than 0.3% by weight, only a little catalytic effect is produced, while if it is greater than 10% by weight, no appreciable increase in catalytic effect is caused.

The coal used in the present invention is a member selected from the group consisting of coking coal, non-coking coal, brown coal, lignite and grass peat. The solvent used in the present invention is a member selected from the group consisting of coal tar or products obtained by the fractional distillation thereof, the decomposition product of coal formed in the coal liquefaction process, heavy petroleum oils having a boiling point of 200° C. or above, and the hydrogenation products of these solvents. The foregoing solvents may be used alone or in admixture.

A slurry composed of coal, a solvent and a catalyst can be prepared according to a number of procedures. For example, 1 part by weight (on a moisture-free basis) of an iron ore is first mixed with from 1.5 to 5 parts by weight of water and then wet ground to form an aqueous slurry of the iron ore. On the other hand, coal is ground to a proper particle size and then mixed with a solvent so that the weight ratio of solvent to coal will vary from about 1:1 to 10:1. To the resulting slurry is added the aforesaid aqueous slurry of the iron ore. Then, the desired slurry is prepared by stirring this mixture with a stirring device or the like until the aqueous slurry of the iron ore is dispersed uniformly. Alternatively, the desired slurry can also be prepared by grinding and mixing the coal, the solvent and the catalyst thoroughly in a wet grinding machine such as a ball mill, a tower mill or the like. Furthermore, it is also possible to grind the iron ore and the coal separately and then disperse them in the solvent or to grind a mixture of the iron ore and the coal and then disperse it in the solvent.

The slurry thus prepared is heated at a temperature of from 300° to 500° C., preferably from 400° to 470° C., under a partial pressure of hydrogen of not less than 10 kg/cm$^2$, preferably from 50 to 500 kg/cm$^2$, to dissolve the coal in the solvent. The heating time should be determined so that the resulting slurry will have such a viscosity as to permit easy filtration. Preferably, it is in the range of from 10 to 120 minutes. Thereafter, the reaction mixture is subjected to a gas-liquid separation step, thereby a gaseous mixture is separated from the coal solution. After carbon dioxide gas and hydrogen sulfide gas are removed from this gaseous mixture, gaseous hydrocarbons are recovered and unconsumed hydrogen gas is recycled. On the other hand, the coal solution which comprises the solvent and the liquid product of the coal and contains insoluble materials such as the catalysts, the ash of coal, undissolved coal and the like may be subjected to a step of separating the insoluble materials. This step can be carried out by using suitable apparatuses such as a filter, a centrifuge and a liquid cyclone or suitable solvent treating processes such as the Lummus Co. process. Whether or not the coal solution has been subjected to such a step of separating the insoluble materials, the coal solution is introduced into an evaporator where the coal liquefaction product which is a liquid at ordinary temperature and the solvent are recovered by distillation, while the coal liquefaction product which is a solid at ordinary temperature is obtained as the residue.

Prior to this introduction of the coal solution into an evaporator, a part of the coal solution may be returned to the slurry preparation tank. This makes it possible to make good us of the iron ore having catalytic activity and thereby decrease the amount of iron ore to be added newly for the preparation of a slurry.

The present process for the liquefaction of coal may be carried out in a batch operation or in a continuous operation.

As can be seen from the above description, the catalysts which are useful in the practice of the present invention are iron ores consisting mainly of a hydrate of iron oxide. They occur abundantly in nature and, hence, are inexpensive. Moreover, since they contain little or no sulfur, the resulting coal liquefaction product is scarcely contaminated with sulfur, so that a clean coal liquefaction product can be obtained. Therefore, especially when coal having a low ash content is liquefied, the resulting coal liquefaction product which is a solid at ordinary temperature can be used directly (that is, without removing the ash and catalyst present therein) as a fuel or a binder for the production of blast furnace coke, thus making it possible to eliminate the step of separating insoluble materials which involves many technological and economical problems among other steps of the coal liquefaction process. Thus, the present invention provides a process for the liquefaction of coal which is very excellent from both technological and economical viewpoints.

The present invention is further illustrated by the following examples. However, these examples are not to be construed to limit the scope of the invention.

EXAMPLES 1 TO 3

Into a 0.5-liter autoclave equipped with a stirring device were charged 50 g (on a water-free and ash-free basis) of Australian brown coal having an ash content of 2.4% by weight and a sulfur content of 0.3% by weight, and 150 g of creosote oil. On the other hand, three iron ores A, B and C consisting mainly of a hydrate of iron oxide were dried at 100° C. for 1.5 hours and then ground. Each of these iron ores, which had the properties shown in Table 1, was added to the autoclave in an amount of 1.5 g. Then, under an initial hydrogen pressure of 120 kg/cm$^2$, the resulting mixture was heated to 450° C. at a rate of 3° C. per minute and stirred at that temperature for 60 minutes to dissolve the brown coal. After the autoclave was cooled to room temperature, its contents were filtered through No. 1 filter paper to separate therefrom insoluble materials including the iron ore, the ash of brown coal, and undissolved brown coal. The filtrate was vacuum distilled under an absolute pressure of 10 mmHg until a cut point of 350° C. was reached. Thus, the solvent and the coal liquefaction product which was a liquid at ordinary temperature were recovered, while the coal liquefaction product which was a solid at ordinary temperature was obtained as the residue.

The results thus obtained are summarized in Table 2.

TABLE 1

Analytical Values (on a Dry Weight Basis) of Iron Ores Used as Catalyst

| | Iron Content (% by weight) | Sulfur Content (% by weight) | Bound Water (% by weight) |
|---|---|---|---|
| Iron Ore A (ochre) | 45.6 | 2.30 | 13.7 |
| Iron Ore B (bog iron ore) | 46.5 | 0.44 | 16.5 |
| Iron Ore C (limonite) | 62.5 | 0.01 | 9.2 |

TABLE 2

Results of Dissolution of Coal

| Example No. | 1 | 2 | 3 |
|---|---|---|---|
| Iron Ore | A | B | C |
| Dissolution Rate of Coal (%) | 95.2 | 95.0 | 93.7 |
| Sulfur Content of Coal Liquefaction Product Which is a Solid at Ordinary Temperature (% by weight) | 0.35 | 0.34 | 0.33 |

COMPARATIVE EXAMPLES 1 TO 5

The procedure of Example 1 was repeated except that hematite, specularite or magnetite consisting mainly of anhydrous iron oxide was used in place of the iron ore consisting mainly of a hydrate of iron oxide, or no catalyst was used. The results thus obtained are summarized in Table 3.

TABLE 3

| Comparative Example No. | 1 | 2 | 3 | 4 | 5 |
|---|---|---|---|---|---|
| Type of Iron Ore | No catalyst | Magnetite (D) | Hematite (E) | Hematite (F) | Specularite (G) |
| Iron content or Iron Ore (% by weight) | — | 66.0 | 62.6 | 64.8 | 68.2 |
| Sulfur Content of Iron Ore (% by weight) | — | 0.05 | 0.02 | 0.01 | 0.01 |
| Dissolution Rate of Coal (%) | 75.7 | 80.2 | 85.3 | 82.2 | 85.0 |
| Sulfur Content of Coal Liquefaction Product Which is a Solid at Ordinary Temperature (% by weight) | 0.47 | 0.46 | 0.39 | 0.40 | 0.38 |

It is evident from this table that the process of the present invention increased the dissolution rate of coal to a marked degree, as compared with the case in which no catalyst was used and the cases in which hematite, specularite or magnetite consisting mainly of anhydrous iron oxide was used. Moreover, it is also noted that the sulfur content of the coal liquefaction product which was a solid at ordinary temperature was reduced.

EXAMPLES 4 TO 6

Employing a ball mill with a diameter of 240 mm, 50 g (on a water-free and ash-free basis) of the same Australian brown coal as used in Example 1, 150 g of creosote oil, and 0.5 g of each of the iron ores A, B and C (which were the same as used in Examples 1 to 3 and had been dried at 100° C. for 1.5 hours) were ground for 3 hours to form a slurry. As described in Example 1, this slurry was charged into a 0.5-liter autoclave. Then, under an initial hydrogen pressure of 120 kg/cm$^2$, the slurry was heated to 450° C. at a rate of 3° C. per minute and stirred at that temperature for 1 hour to dissolve the brown coal. Thereafter, the slurry was worked out in the same manner as in Example 1. The results thus obtained are summarized in Table 4.

TABLE 4

| Example No. | 4 | 5 | 6 |
|---|---|---|---|
| Iron Ore | A | B | C |
| Dissolution Rate of Coal (%) | 86.4 | 88.7 | 86.0 |
| Sulfur Content of Coal Liquefaction Product Which is a Solid at Ordinary Temperature (% by weight) | 0.40 | 0.39 | 0.39 |

It is evident from this table that, even when the catalyst was used in an amount of as little as 1.0% by weight based on the weight of the coal as expressed on a water-free and ash-free basis, the process of the present invention increased the dissolution rate of coal by more than 10%, as compared with the case in which no catalyst was used. Moreover, it is also noted that the sulfur content of the coal liquefaction product which was a solid at ordinary temperature was reduced.

EXAMPLE 7

The procedure of Example 1 was repeated except that 50 g (on a water-free and ash-free basis) of Australian non-coking coal having an ash content of 22.4% by weight and a sulfur content of 0.6% by weight was used in place of the brown coal. The results thus obtained are summarized in Table 5.

TABLE 5

| Dissolution Rate of Coal (%) | 91.9 |
|---|---|
| Sulfur Content of Coal Liquefaction Product Which is a Solid at Ordinary Temperature (% by weight) | 0.40 |

COMPARATIVE EXAMPLE 6

The procedure of Example 7 was repeated except that no catalyst was used. The results thus obtained are summarized in Table 6.

TABLE 6

| Dissolution Rate of Coal (%) | 86.3 |
|---|---|
| Sulfur Content of Coal Liquefaction Product Which is a Solid at Ordinary Temperature (% by weight) | 0.84 |

Thus, the catalysts which are useful in the practice of the present invention can also be applied to the liquefaction of non-coking coal. In such a case, it is noted again that the dissolution rate of coal is increased and the sulfur content of the coal liquefaction product is reduced markedly.

What is claimed is:

1. In a process for the liquefaction of coal by heating a slurry composed of the coal, a solvent and a catalyst under an elevated pressure of hydrogen, the improvement in which the catalyst is an iron ore consisting mainly of a hydrate of iron oxide, said iron ore containing from 20 to 70 percent by weight of iron, not more than 3 percent by weight of sulfur, and from 5 to 20 percent by weight of bound water, based on the weight of the iron ore freed of adhesive moisture.

2. The process according to claim 1 wherein the iron ore is selected from the group consisting of limonite, lepidocrocite, goethite, bog iron ore, ochre, and hydrated iron oxide obtained by precipitating iron oxide from mine waste water.

3. The process according to claim 1 wherein, on the assumption that the catalyst comprises an iron ore freed of adhesive moisture, the catalyst is used in an amount of from 0.3 to 10% by weight based on the weight of the coal as expressed on a water-free and ash-free basis.

4. The process according to claim 4 wherein the catalyst is formed into an aqueous slurry and then mixed with a slurry composed of the coal and the solvent.

5. The process according to claim 3 wherein the catalyst is wet ground together with the solvent and the coal.

6. The process according to claim 3 wherein the catalyst is ground and then mixed with the solvent.

7. The process according to claim 3 wherein the catalyst is ground together with the coal and then mixed with the solvent.

* * * * *